United States Patent
Annapureddy

(10) Patent No.: US 12,166,797 B2
(45) Date of Patent: Dec. 10, 2024

(54) SYSTEM AND METHOD FOR CLASSIFYING A USER FOR DETECTING PHISHING ATTACKS

(71) Applicant: Tanla Digital Labs Private Limited, Hyderabad (IN)

(72) Inventor: Krishna Kishore Annapureddy, Hyderabad (IN)

(73) Assignee: Tanla Digital Labs Private Limited, Hyderabad (IN)

( * ) Notice: Subject to any disclaimer, the term of this patent is extended or adjusted under 35 U.S.C. 154(b) by 0 days.

(21) Appl. No.: 18/647,427

(22) Filed: Apr. 26, 2024

(65) Prior Publication Data

US 2024/0364737 A1 Oct. 31, 2024

(51) Int. Cl.
H04L 9/40 (2022.01)

(52) U.S. Cl.
CPC ...... *H04L 63/1483* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 7,953,814 B1* | 5/2011 | Chasin | ................. | H04L 51/212 726/25 |
| 9,686,308 B1* | 6/2017 | Srivastava | ............... | H04L 12/14 |
| 10,877,977 B2* | 12/2020 | Garg | ........................ | H04L 51/52 |
| 11,757,914 B1* | 9/2023 | Jakobsson | ............... | H04L 51/42 726/25 |
| 2005/0080856 A1* | 4/2005 | Kirsch | .................. | H04L 63/145 709/224 |
| 2007/0078936 A1* | 4/2007 | Quinlan | ............... | G06Q 10/107 709/206 |
| 2013/0041955 A1* | 2/2013 | Chasin | .................. | H04L 51/212 709/206 |
| 2014/0047544 A1* | 2/2014 | Jakobsson | ............. | G06F 21/566 726/23 |
| 2016/0330226 A1* | 11/2016 | Chen | ........................ | H04L 63/14 |
| 2017/0118240 A1* | 4/2017 | Devi Reddy | .......... | G06N 20/00 |
| 2017/0251006 A1* | 8/2017 | LaRosa | ................ | H04L 63/1441 |
| 2020/0007502 A1* | 1/2020 | Everton | ................ | H04L 51/063 |
| 2020/0067861 A1* | 2/2020 | Leddy | ................. | G06F 21/6245 |
| 2020/0389469 A1* | 12/2020 | Litichever | ............... | H04W 4/40 |

(Continued)

*Primary Examiner* — Khang Do
(74) *Attorney, Agent, or Firm* — HSML P.C.

(57) ABSTRACT

Disclosed herein is a method and a system for classifying a user for detecting phishing attacks. The system retrieves communication data associated with a plurality of users from a telecom server and creates a user relationship model in a database. The user relationship model comprises a plurality of nodes representing the plurality of users, each node comprises the communication data and an initial reputation score. The system determines one or more senders to the user from the user relationship model and determines a subset of senders based on the initial reputation score of each of the one or more senders. The system updates the user relationship model at least by updating the initial reputation score of the user based on the communication data of each of the subset of senders and classifies the user as one of 'genuine' and 'phishing' based on the updated user relationship model.

27 Claims, 5 Drawing Sheets

(56) References Cited

U.S. PATENT DOCUMENTS

| | | | |
|---|---|---|---|
| 2022/0141669 A1* | 5/2022 | Daumer | H04L 63/1483 |
| | | | 726/23 |
| 2022/0321518 A1* | 10/2022 | Khan | H04L 63/08 |
| 2023/0171212 A1* | 6/2023 | Hathaway | H04L 51/52 |
| | | | 709/206 |
| 2023/0208875 A1* | 6/2023 | Do | H04L 63/1425 |
| | | | 726/22 |
| 2023/0209351 A1* | 6/2023 | Djankovic | H04W 12/48 |
| | | | 455/411 |
| 2023/0319065 A1* | 10/2023 | Mears | H04L 51/21 |
| | | | 726/23 |

* cited by examiner

SYSTEM AND METHOD FOR CLASSIFYING A USER FOR DETECTING PHISHING ATTACKS

FIELD OF THE DISCLOSURE

The present disclosure in general relates to detection of fraud and more particularly, to a method and system for classifying a user for detecting phishing attacks in Short Messaging Service (SMS) communications.

BACKGROUND

Phishing attacks have been escalating day by day, where attackers deceive people into revealing sensitive information or installing malware such as, without limiting to, ransomware. Of late, phishing has become the most common type of cybercrime, with many cybercrime regulatory bodies reporting more incidents of phishing than any other type of digital crime. Smishing is a type of phishing attack that includes attackers sending various types of Short Messaging Service (SMS) messages to a user, wherein the SMS messages may contain links to open unsecured websites and prompt the user for login credentials or other personal data. Smishing attacks target mobile phone users, enticing them with exciting job offers, holiday offers or lottery prizes, which eventually result in the users revealing confidential information such as, without limiting to, usernames, passwords, credit card or debit card details etc.

Currently, there exist plenty of algorithms and systems for detecting phishing emails, categorizing them as spam or junk and automatically filtering such emails from the inbox. Such anti-phishing systems can be easily designed due to the highly secured internet platform, a number of internet service providers providing secured connections and most importantly due to firewalls installed in every computing device. On the other hand, phishing that occurs through the telecommunication channels, unfortunately, does not involve such secured gateways to filter out phishing SMSs, and hence phishing through SMS has been increasing day by day.

One way to detect phishing attacks may be to classify users as 'genuine' or 'phishing'. Existing user classification methods require huge communication data of the users to classify the users. However, the existing methods may leave many users unclassified for whom such communication data is unavailable, thereby resulting in inefficient detection of the phishing attacks.

Hence, there exists is a need for a system and method to classify a user accurately and efficiently for detecting phishing attacks.

The information disclosed in this background of the disclosure section is only for enhancement of understanding of the general background of the disclosure and should not be taken as acknowledgment or any form of suggestion that this information forms prior art already known to a person skilled in the art.

SUMMARY

Disclosed herein is a method for classifying a user for detecting phishing attacks. The method comprises retrieving communication data associated with a plurality of users from a telecom server and creating a user relationship model in a database. The user relationship model comprises a plurality of nodes representing the plurality of users, each node comprises the communication data and an initial reputation score. The method comprises determining one or more senders to the user from the user relationship model and determining a subset of senders based on the initial reputation score of each of the one or more senders. The method comprises updating the user relationship model at least by updating the initial reputation score of the user based on the communication data of each of the subset of senders and classifying the user as one of 'genuine' and 'phishing' based on the updated user relationship model.

Further disclosed herein is a system for classifying a user for detecting phishing attacks, comprising a memory and a processor communicatively coupled with each other. The processor is configured to retrieve communication data associated with a plurality of users from a telecom server and creates a user relationship model in a database. The user relationship model comprises a plurality of nodes representing the plurality of users, each node comprises the communication data and an initial reputation score. The processor is configured to determine one or more senders to the user from the user relationship model and determine a subset of senders based on the initial reputation score of each of the one or more senders. The processor is configured to update the user relationship model at least by updating the initial reputation score of the user based on the communication data of each of the subset of senders and classify the user as one of 'genuine' and 'phishing' based on the updated user relationship model.

Also disclosed herein is a non-transitory computer-readable medium, having program instructions stored thereon, when executed by a system, facilitate the system to classify a user for detecting phishing attacks by performing operations. The operations comprise retrieving communication data associated with a plurality of users from a telecom server and creating a user relationship model in a database. The user relationship model comprising a plurality of nodes representing the plurality of users, wherein each of the plurality of nodes comprising at least the communication data and an initial reputation score. The operations comprise determining one or more senders to the user from the user relationship model and determining a subset of senders based on the initial reputation score of each of the one or more senders. The operations further comprise updating the user relationship model at least by updating the initial reputation score of the user based on the communication data of each of the subset of senders and classifying the user as one of 'genuine' user and 'phishing' based on the updated user relationship model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

Figure 1:
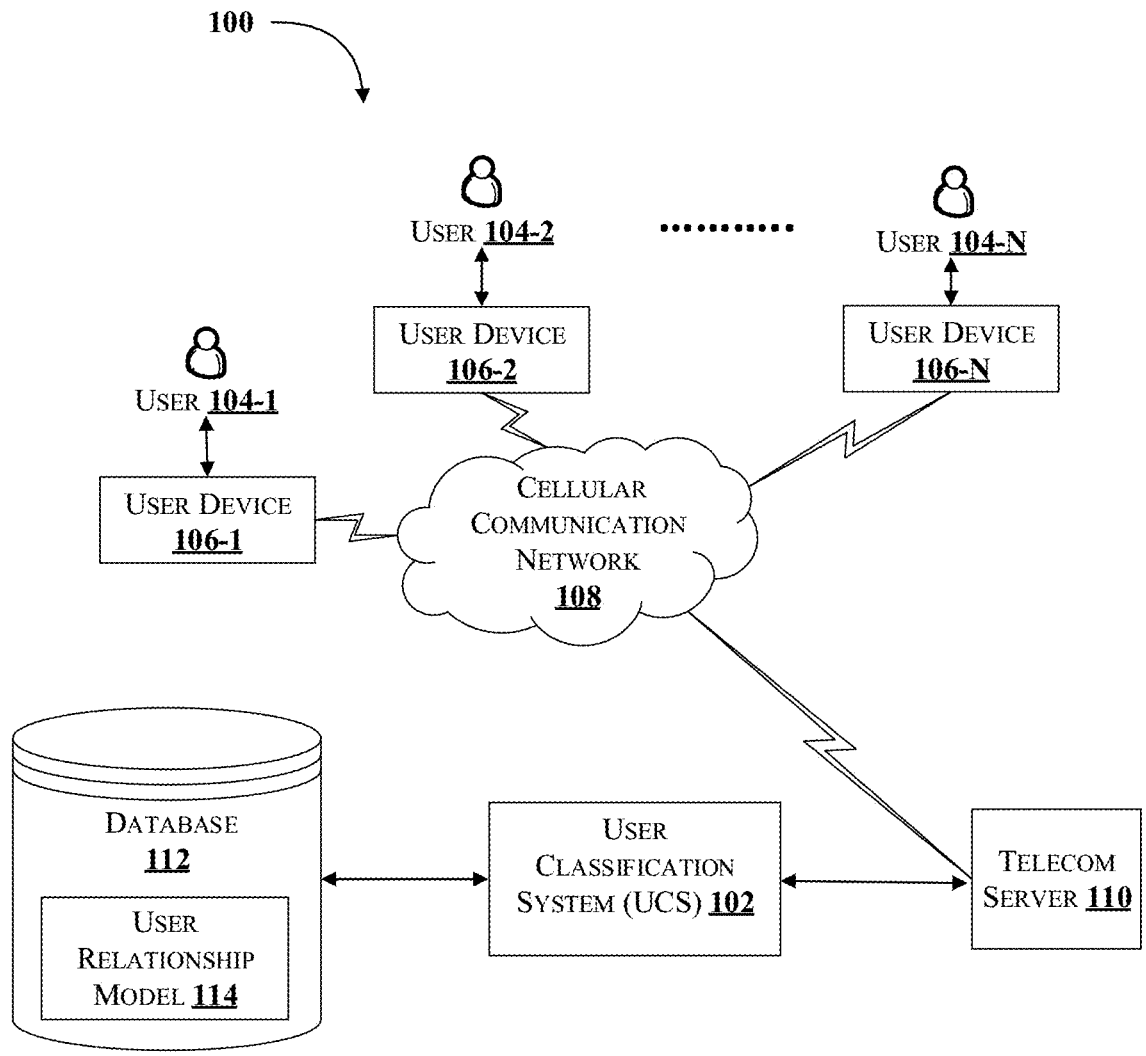
FIG. 1 illustrates an exemplary architecture for classifying a user for detecting phishing attacks in accordance with an embodiment of the present disclosure.

The FIGURES depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The present disclosure relates to methods and systems for classifying a plurality of users communicating in a cellular communication network. The system may communicate with a telecom server of the cellular communication network to retrieve communication data of a plurality of users. The system may analyse the communication data to create a user relationship model representing communication between the plurality of users. The system may determine an initial reputation score for each of the plurality of users and further may update the reputation score of a user based on the initial reputation scores of other users communicating with the user. For instance, if a first 'genuine' user has received a message from a second 'genuine' user, the system may update the reputation score of the first 'genuine' user based on an initial reputation score of the second 'genuine' user. The system may update the user relationship model by updating the initial reputation scores of the plurality of users and may classify the plurality of users based on the updated user relationship model. Thus, the system enables an efficient classification of a user based on a reputation of other users. The system particularly enables classification of new users for whom the classification may not be available, based on limited communication data.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture for classifying a user for detecting phishing attacks in accordance with an embodiment of the present disclosure.

As shown in FIG. 1, the exemplary architecture 100 comprises one or more components configured for classifying a user for detecting phishing attacks in a cellular communication implementation. In one embodiment, the architecture 100 comprises a User Classification System (UCS) 102 configured to classify a plurality of users 104-1, 104-2, . . . 104-N (collectively referred as users 104) as 'genuine' or 'phishing'. The plurality of users 104 are associated with a plurality of user devices 106-1, 106-2, . . . 106-N (collectively referred as user devices 106), which are configured to communicate with each other using a cellular communication network 108. The UCS 102 may be communicatively coupled with a telecommunication server 110 (hereinafter referred to as 'telecom server' 110) and a database 112. In some embodiments, the database 112 may be configured within the UCS 102.

The plurality of user devices 106 may include any electronic device installed with a Subscriber Identity Module (SIM), or a computing device registered with the plurality of users 104, capable of communicating through cellular communication network 108. The plurality of users 104 may be individual users communicating with each other in a Person to Person (P2P) communication or may be one or more entities, such as, but not limited to, banks and enterprises, communicating with the individual users in an Applicant to Person (A2P) communication. The plurality of users 104 communicate with the electronic device installed with SIMs in the P2P communication or communicate, in particular send any message, through the computing device in the A2P communication.

The cellular communication network 108 may be a mobile communication network that provides wireless communication for voice, data and SMS to user devices 106. The cellular communication network 108 may be any of a $2^{nd}$ Generation (2G) network, a $3^{rd}$ Generation (3G) network, Global System for Mobile communication (GSM), Code Division Multiple Access (CDMA), General Packet Radio Service (GPRS), a $4^{th}$ Generation (4G) network, a Long-Term Evolution (LTE) network, a Voice over LTE (VoLTE) network, a $5^{th}$ Generation (5G) network, a $6^{th}$ Generation (6G) network or other networks.

The telecom server 110 may be configured to receive and store communication data associated with the plurality of users 106. The telecom server 110 may be communicatively coupled with the cellular communication network 108 to receive the communication data of the plurality of users and store the communication data in the telecom server 110. In some embodiments, the telecom server 110 may be configured to route one or more messages to one or more recipients. Thus, the telecom server 110 enables allowing one or more messages sent by a 'genuine' user or blocking one or more messages sent by a 'phishing' user to the one or more users 104.

The database 112 may be a centralized database or a decentralized database coupled with the UCS 102 and may be configured to store a user relationship model 114 generated by the UCS 102. The database 112 may also be configured to update the user relationship model 114 periodically and/or upon receiving one or more updates from the UCS 102.

In operation, the UCS 102 may retrieve the communication data of the plurality of users 104 from the telecom server 110 periodically and may create a user relationship model 114 based on the communication data. The user relationship model 114 may indicate a historical communication between a user and a plurality of other users. The UCS 102 may determine an initial reputation score for each of the plurality of users 104 and may update the reputation score of a user based on the initial reputation scores of other users communicating with the user. For instance, if a first 'genuine' user has received a message from a second 'genuine' user, the UCS 102 may update the reputation score of the first 'genuine' user based on an initial reputation score of the second 'genuine' user. The UCS 102 may update the user relationship model by updating the initial reputation scores of the plurality of users 104 and may classify the plurality of users 104 based on the updated user relationship model. Thus, the UCS 102 enables an efficient classification of a user 104 by classifying the user 104 based on a reputation of other users.

Figure 2:
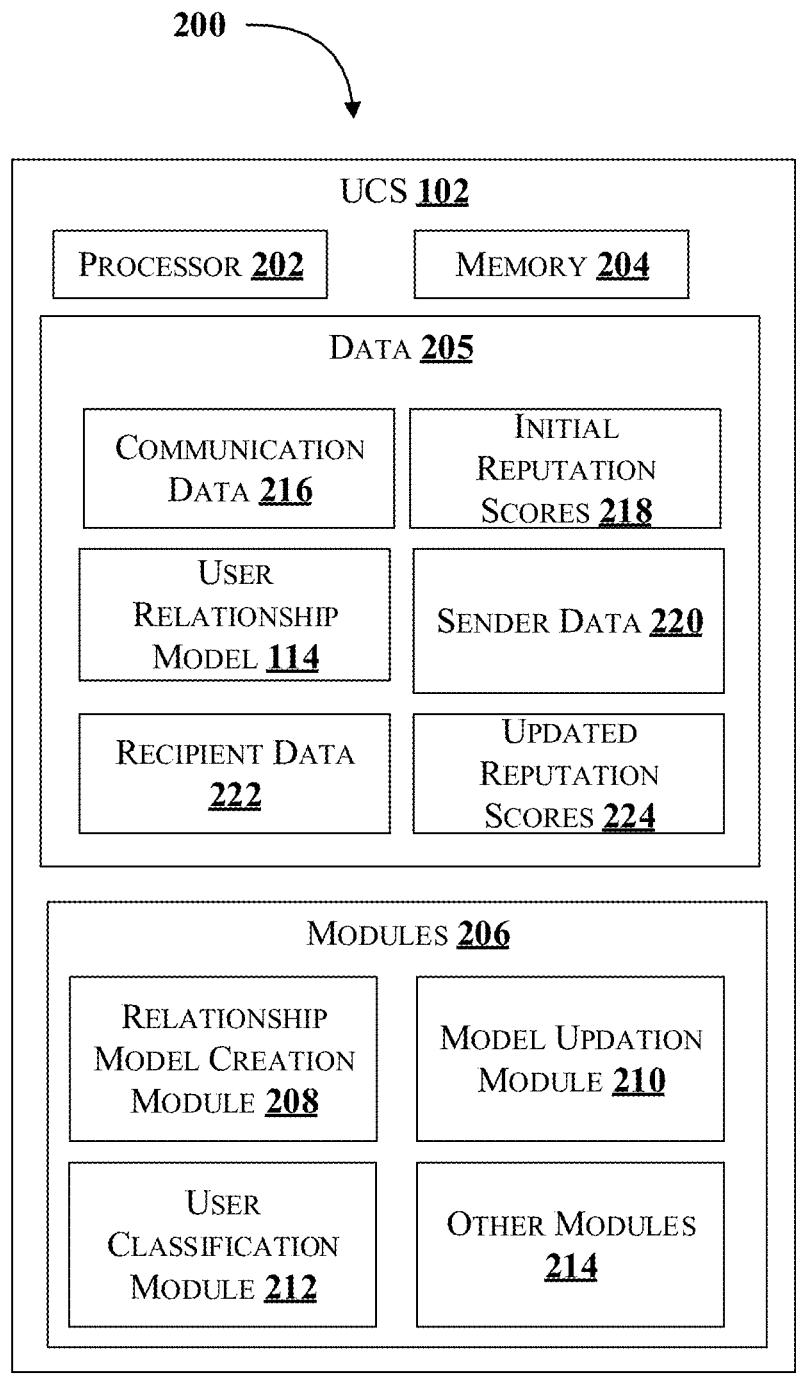
FIG. 2 illustrates a block diagram of a User Classification System (UCS) in accordance with an embodiment of the present disclosure.

FIG. 2 illustrates a block diagram of the UCS 102 in accordance with an embodiment of the present disclosure.

As shown in FIG. 2, the UCS 102 may comprise a processor 202, a memory 204, data 205 and a plurality of modules 206. The modules 206 include, without liming to, a relationship model creation module 208, a model updation module 210, the user classification module 212 and other modules 214. The plurality of modules 206 may be implemented using hardware, and/or software, or partly by hardware and partly by software or firmware. In one embodiment, the plurality of modules 206 may be configured within the processor 202. The data 205 may include, without limiting to, communication data 216, initial reputation scores 218, user relationship model 114, sender data 220, recipient data 222 and updated reputation scores 224.

The relationship model creation module 208 may retrieve communication data 216 of the plurality of users 104 from the telecom server 110. The communication data 216 may comprise voice communication and SMS communication of the plurality of users 104. The relationship model creation module 208 may generate a plurality of nodes indicating the plurality of users 104. Each of the plurality of nodes comprises an identifier of a user, the communication data and an initial reputation score associated with the user 104. The plurality of users 104 may comprise individual users communicating using P2P communication or entities communicating using A2P communication. In the case of the user 104 being an individual user, the identifier may relate to a Subscriber Identity Module (SIM) registered in the name of the user 104. In the case of the user 104 being an entity, the identifier may relate to an A2P header registered in the name of the entity for transmitting one or more SMS messages to the plurality of users 104. It may be noted that in the present disclosure, the phrase "user" may alternatively be referred to as a "SIM card" or an "A2P header" associated with the user.

The relationship model creation module 208 may generate a relationship between the plurality of users 104 based on the communication data 216. The relationship model creation module 208 may determine one or more senders to the user 104 and store information related to the one or more senders as sender data 220. A sender may be defined as a user sending at least one message or a voice call to the user 104. The information related to the one or more senders may include, but not limited to, a SIM card number or an A2P header, communication data and an initial reputation score associated with each of the one or more senders. The relationship model creation module 208 may create a sender connection between the user 104 and each of the one or more senders in the user relationship model 114. The sender connection may be represented as an outward connection from the user 104 to each of the one or more senders.

Alternatively, the relationship model creation module 208 may determine one or more recipients for the user 104 and may store information related to the one or more recipients as recipient data 222. A recipient may be defined as a user receiving at least one message or a voice call from the user 104. The information related to the one or more recipients may include, but not limited to, a SIM card number or an A2P header and communication data associated with each of the one or more recipients. The relationship model creation module 208 may create a recipient connection between the user 104 and each of the one or more recipients. The recipient connection may be represented as an inward connection to the user 104 from each of the one or more recipients. In some embodiments, the sender and recipient connections at the plurality of users 104 may be weighed, such as but not limited to, thick connections or thin connections, based on a number of historical communications between the users. It may be noted that the methods and systems of user classification may be described herein in the context of the user 104, while the methods described herein may also be applicable for the plurality of users 104.

The relationship model creation module 208 may evaluate the initial reputation score 218 of the user 104 based on one or more reputation parameters comprising at least one of a count of messages received by the user 104, a count of messages transmitted by the user 104 to other users, and a count of messages received from a 'genuine' sender. In some embodiments, the relationship model creation module 208 may also evaluate the initial reputation score 218 of each of the users 104 based on one or more reputation parameters. The relationship model creation module 208 may evaluate the initial reputation score 218 for the user 104 based on a number of attributes. If the user 104 corresponds to an enterprise header in an A2P communication, the attributes may include, but not limited to, the enterprise header, a name of an entity associated with the enterprise header, a registration date and a telecom operator associated with the enterprise header, average volume of SMS messages sent from the enterprise header in a month, a number of complaints associated with the enterprise header, an industry category of the entity, a type of the SMS message sent by the enterprise header, a template identifier of a predetermined message pattern that matches with a message pattern of the SMS message, a number of variables in the predetermined message pattern, and a percentage of a static message content in the SMS message.

If the user 104 corresponds to an individual user, communicating using a SIM card number to send or receive SMS message, also referred to as a Person to Person (P2P) communication, the attributes may include, but not limited to, a longevity of the SIM card number, a number of SMS messages sent from and received by the SIM card number, a number of A2P SMS messages received on the SIM card number, a length of the SMS message, a type of the SMS message, such as, without limiting to, 'phishing' or 'genuine', and a telecom operator associated with the SIM card number.

In one embodiment, the initial reputation score 218 may comprise a range of values from negative or positive values such as from −1 to +1 based on the evaluation. The initial reputation score 218 may be a negative value such as "−1" for a 'phishing' user, whereas a positive value, for a 'genuine' user. The initial reputation score 218 may be a default '0' indicating unknown for 'new' users who have started using the SIM card.

In one embodiment, the relationship model creation module 208 may determine the initial reputation score based on one or more messages received from at least one genuine user in the last one month and may assign an initial reputation score 218 as "+1" indicating that the user 208 is a 'genuine' user. In an alternative embodiment, the relationship model creation module 208 may compute a ratio of a number of SMS sent by the user 104 to a number of SMS received by the user 104, also referred herein as a send to receive ratio, to evaluate the initial reputation scores of the users 104. When the send-to-receive ratio is less, it is indicative that the user 104 has sent lesser number of messages than the number of messages received by the user, which may further indicate that the user 104 may be 'genuine' with initial reputation score 218 as '+1'. Alternatively, when the send-to-receive ratio is high, it indicates that the user has sent higher number of messages while receiving very less number of messages, which may indicate that the user 104 may be 'phishing', with the initial reputation score 218 as "−1".

Thus, the relationship model creation module 208 may create the user relationship model 114 comprising the plurality of nodes representing the plurality of users 104 and relationship between the plurality of nodes such as by creating sender connections and recipient connections at the plurality of nodes. The relationship model creation module 208 may, at any point of time, add a new user or delete an existing user from the user relationship model 114 based on the communication data 214. In some embodiments, the UCS 102 may create the user relationship model 114 in the database 112.

The model updation module 210 may be configured to update the user relationship model 114 by updating the initial reputation scores 218 of the plurality of users 104. The model updation module 210 may classify the plurality of users 104 as one of 'genuine' user or 'phishing' user based on the initial reputation scores 218. The model updation module 210 may group one or more 'genuine' senders as a subset of senders, also referred to herein as genuine senders. The model updation module 210 may update the initial reputation score 218 of the user 104 based on the communication data of each of the subset of senders. The model updation module 210 may evaluate a first update factor indicating a propagation of reputation from the one or more senders to the user 104. The first update factor is evaluated at least based on the initial reputation score 218 ($SR_{in}$) of each genuine sender, a count of messages received from each genuine sender ($Vol_{S2U}$), a count of messages transmitted by the user 104 ($Vol_{SU}$) and a count of messages received by the user 104 ($Vol_{RU}$). In one example, the first update factor may be evaluated by equation (1):

$$\text{First update factor} = SR_{in} * \frac{Vol_{S2U}}{Vol_{SU} + Vol_{RU}} * D \quad (1)$$

wherein 'D' is a decay parameter.

Further, the model updation module 210 may update the initial reputation score 218 of the user 104 to an updated reputation score based on a sum of the initial reputation score 218 and the first update factor. The first update factor may indicate a propagation of reputation of genuine senders to the user within the user relationship model. Thus, the user's reputation may increase if the user receives a message or a voice communication from one or more genuine senders. Thus, the model updation module 210 may update the user relationship model 114 by updating the reputation score of the user 104.

The model updation module 210 may be configured to update the initial reputation scores 218 of the one or more senders based on the initial reputation score 218 of the user 104 when the user 104 is a 'phishing' user. The model updation module 210 may generate a second update factor, for each of the one or more senders, indicating propagation of reputation from the user 104 to the one or more senders. The second update factor may be generated at least based on the initial reputation score of the user 104 ($UR_{in}$), a count of messages received by the user 104 from each of the one or more senders ($Vol_{S2U}$), a count of messages transmitted by each of the one or more senders ($Vol_{SS}$) and a count of messages received by each of the one or more senders ($Vol_{RS}$). In one example, the second update factor may be evaluated by equation (2):

$$\text{Second update factor} = UR_{in} * \frac{Vol_{S2U}}{Vol_{SS} + Vol_{RS}} * D \quad (2)$$

wherein 'D' is the decay parameter. Further, the model updation module 210 may update the reputation score of each of the one or more senders to an updated sender reputation score, based on the second update factor generated for each of the one or more senders. The second update factor indicates that the user's reputation may be propagated to the one or more senders if the user is a phishing user. In other words, when a sender sends any message or a voice call to a phishing user, the phishing user's reputation may be propagated to the sender that reduces the reputation of the sender. Thus, the model updation module 210 may update the user relationship model 114 by updating the reputation scores of the one or more senders of the user 104.

The model updation module 210 may be configured to update the initial reputation scores 218 of the one or more recipients based on the initial reputation score 218 of the user 104 only when the user 104 is a 'genuine' user. The model updation module 210 may group one or more 'genuine' recipients as a subset of the recipients and may generate a third update factor for each of the subset of recipients. The third update factor may be generated at least based on the initial reputation score 218 of the subset of recipients ($RR_{in}$), a count of messages received by the subset of recipients ($Vol_{U2R}$) from the user 104, a count of messages transmitted by the subset of recipients ($Vol_{SR}$) and a count of messages received by the subset of recipients ($Vol_{RR}$).

$$\text{Third update factor} = RR_{in} * \frac{Vol_{U2R}}{Vol_{RS} + Vol_{RR}} * D \quad (3)$$

Further, the model updation module 210 may update the initial reputation score of each of the subset of recipients to an updated recipient reputation score based on a sum of the initial reputation score 218 and the third update factor of each of the subset of recipients. The third update factor indicates that the user's reputation may be propagated to the user's recipients when the user is 'genuine'. Thus, the reputation of the recipients may be increased based on the reputation of the genuine user. Thus, the model updation module 210 may update the user relationship model 114 by updating the reputation scores of the one or more recipients of the user 104.

Thus, the model updation module 210 may update the user relationship model 114 by updating the initial reputation scores of the plurality of users 104 as updated reputation scores 224. In some embodiments, the UCS 102 may update the user relationship model 114 stored in the database 112 based on the first update factor, the second update factor and the third update factor. The updation of the user relationship model 114 may enable classification of the 'unknown' users based on the updated reputation scores. For instance, the initial reputation score '0' of the 'unknown' user may be updated to a positive non-zero value upon receiving a message or a call from a genuine user, thus classifying the 'unknown' user as 'genuine' user.

Further, the user classification module 212 may classify the plurality of users 104 based on the updated reputation scores 224 of the updated user relationship model 114 as one of 'genuine' or 'phishing'. The user classification module 212 may also dynamically block routing of one or more messages received from a SIM associated with a 'phishing' user. The user classification module 212 may generate a blocking notification for blocking the routing. The blocking notification comprises the identifier of the SIM, the one or more messages received from the SIM and the updated reputation score of the 'phishing' user. The user classification module 212 may further transmit the blocking notification to the telecom server to block the one or more messages sent from the SIM from being delivered to one or more intended recipients. In some embodiments, if the blocking notification is received for the user 104 for a predetermined number of times, the telecom server 110 may de-activate the SIM card associated with the user 104. In these embodiments, the UCS 102 may reset the initial reputation score associated with the SIM card as '0' considering the SIM card is provided to a new user after a predetermined time period of de-activation.

The UCS 102 may update the user relationship model 114 iteratively at predetermined time intervals or upon a request to detect a phishing attack. When the user relationship model 114 is to be updated iteratively, the UCS 102 considers updated user relationship model 114 and updated reputation scores 224 of a current iteration as initial user relationship model 114 and initial reputation scores 218 of a next iteration.

The UCS 102 may thus enable efficient user classification by updating the user relationship model based on reputation scores of other users. The UCS 102 may also enhance classification of 'unknown' users by updating the initial reputation scores of 'unknown' users based on the initial reputation scores of the senders or the recipients of the 'unknown' users.

Figure 3:
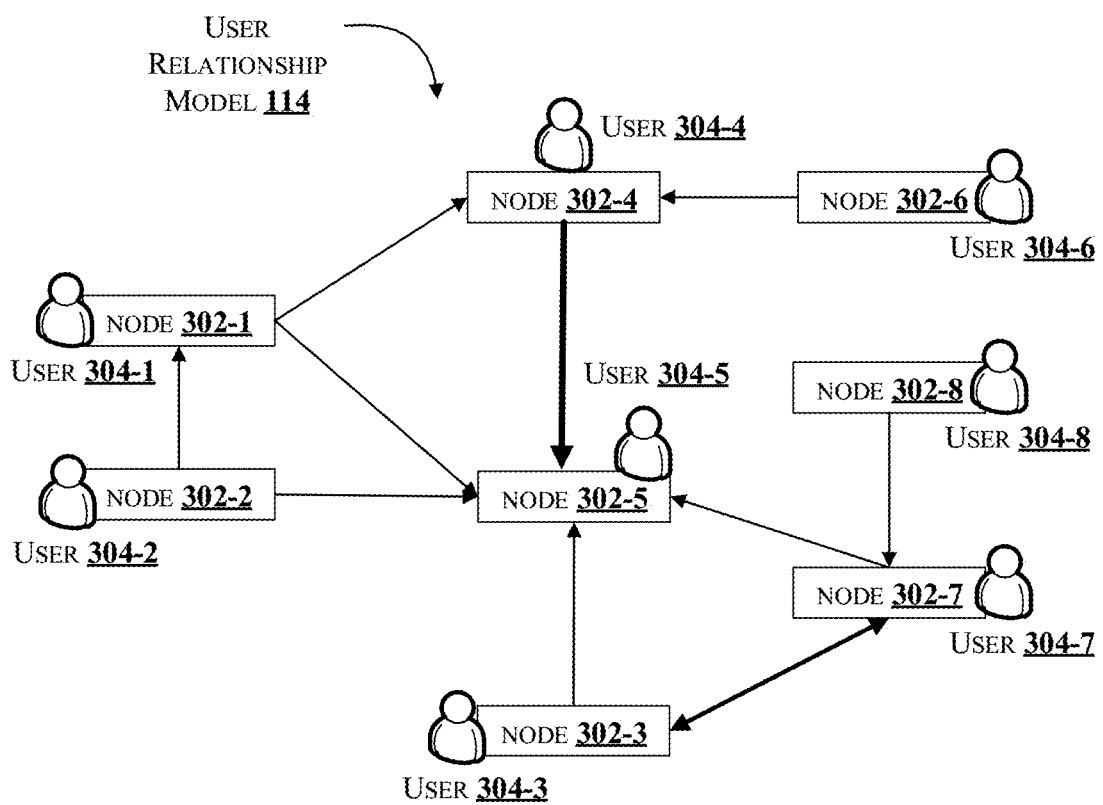
FIG. 3 illustrates an example of classifying the user in accordance with an embodiment of the present disclosure.

FIG. 3 illustrates an example of creating and updating the user relationship model 114 in accordance with an embodiment of the present disclosure.

The UCS 102 may create a plurality of nodes 302-1, . . . 302-8 (collectively referred to as plurality of nodes 302) corresponding to a plurality of users 304-2, . . . . 304-8 (collectively referred to as plurality of users 308) based on communication data retrieved from the telecom server 110. Each node 302 comprises a SIM number, the communication data and an initial reputation score of the corresponding user 304. Further, the UCS 104 may determine one or more senders and one or more recipients for each user 304 and create sender connections and recipient connections. The sender or recipient connections may be thick or thin based on a count of connections between a sender and corresponding recipient. As an example, the thick sender connection between the user 304-4 and the user 304-5 may indicate that the user 304-4 receives a high number of messages from the user 304-5.

As shown in FIG. 3, the users 304-1, 304-2, 304-3, 304-4 and 304-7 may be classified as 'genuine', the user 304-5 may be classified as 'phishing' and the users 304-6 and 304-8 may be classified as 'unknown' based on their initial reputation scores. For instance, the users 304-6 and 304-8 may have started using their SIMs only in the recent past communicating only with the user 304-4 and the user 304-7, respectively. Hence the initial reputation scores of the users 304-6 and 304-8 may not be sufficient enough to classify the users 304-6 and 304-8 as either 'genuine' or 'phishing'.

In this scenario, the UCS 102 may update the user relationship model 114 based on the first update factor, the second update factor and the third update factor wherein the initial reputation scores of the plurality of users 304-1, . . . 304-8 may be updated to updated reputation scores based on the initial reputation scores of the corresponding senders and/or recipients.

For instance, when the user 304-5 continuously sends a number of messages to various users but does not receive any communication from at least one genuine user, the initial reputation score, for e.g. '−0.6', of the user 304-5 may continuously reduce for e.g., to '−1'.

In another instance, when the user 304-6 has received a message from the user 304-4 who may be a genuine user, the reputation of the user 304-4 may be propagated to the user 304-6 by updating the initial reputation score of the user 304-6 based on the initial reputation score of the user 304-4. Thus, the reputation of the user 304-4 may increase positively. Similarly, if the user 304-8 receives a voice call from the user 304-7 who is also 'genuine', the reputation of the user 304-7 may increase based on the reputation of the user 304-7. Further, as the user relationship model 114 continuously updates itself, the 'unknown' users may soon be classified as 'genuine' or 'phishing' based on the propagation of the reputation from genuine users.

Figure 4:
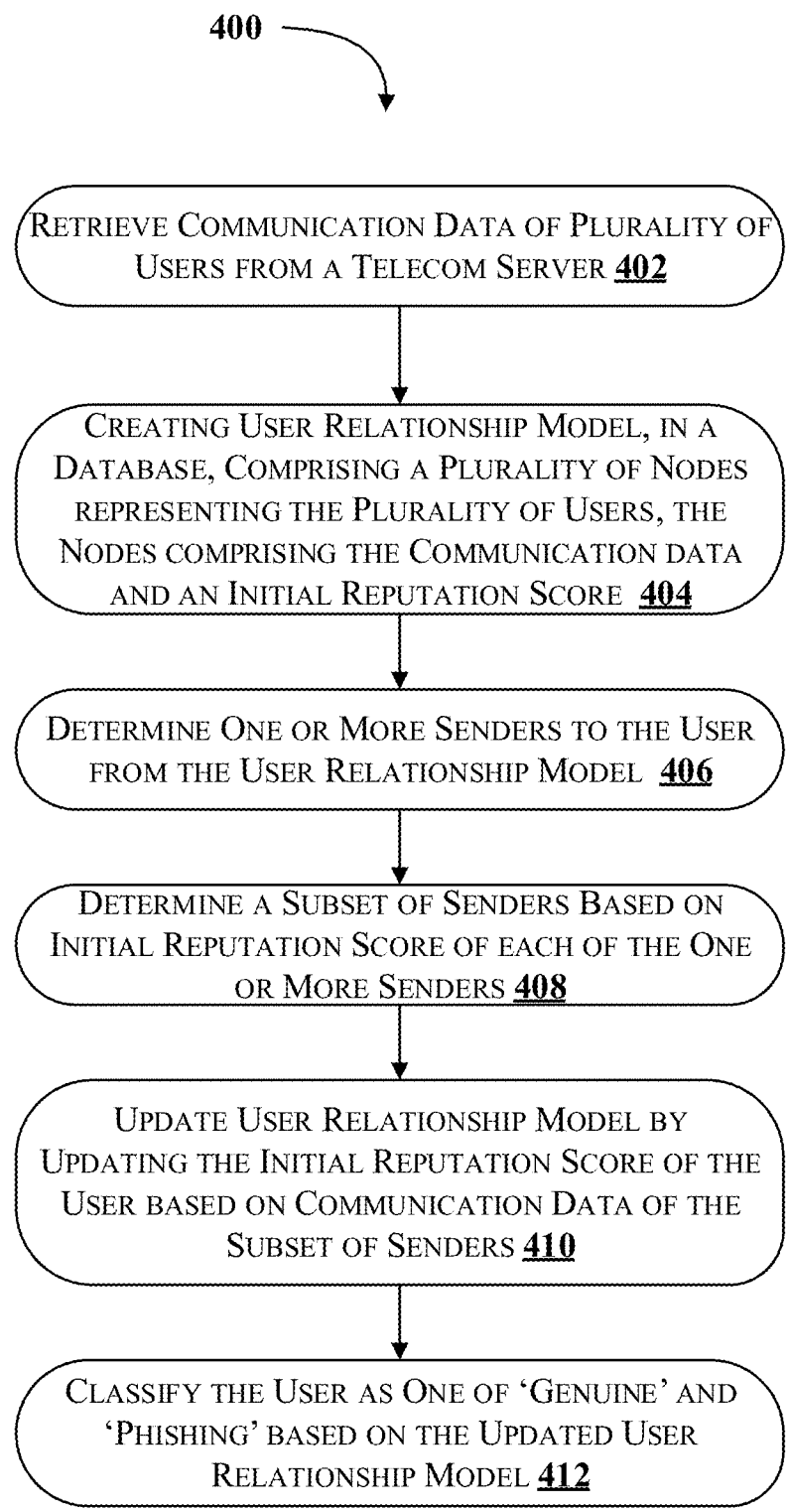
FIG. 4 illustrates a flowchart illustrating a method of user classification in accordance with an embodiment of the present disclosure.

FIG. 4 illustrates a flowchart illustrating a method of user classification in accordance with an embodiment of the present disclosure.

The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 402, the UCS 102 may retrieve communication data of a plurality of users 104 from the telecom server 110 for classifying the plurality of users 104 for detecting phishing attacks.

At step 404, the UCS 102 may create the user relationship model 114 in the database 112. The user relationship model 114 may comprise a plurality of nodes representing the plurality of users, the nodes comprising the communication data and an initial reputation score of each user.

At step 406, the UCS 102 may determine one or more senders to the user 104 from the user relationship model 114.

At step 408, the UCS 102 may determine a subset of senders based on initial reputation score of each of the one or more senders.

At step 410, the UCS 102 may update the user relationship model 114 by updating the initial reputation score of the user 104 based on communication data 216 of the subset of senders.

At 412, the UCS 102 may classify the user as one of 'genuine' and 'phishing' based on the updated user relationship model 412.

Thus, the UCS 102 may enable efficient and accurate classification of the users by periodically creating and updating the user relationship model 114. Further, the UCS 102 may also enable classification of 'unknown' users who may have started communicating in the recent past by propagating reputation of other users to the 'unknown' users. The UCS 102 thereby reduces a number of 'unknown' users among the plurality of users by propagating the reputation of senders and/or recipients to the 'unknown' users. Furthermore, the UCS 102 also significantly reduce any false positives or false negatives in user classification as the UCS 102 regularly updates the user relationship model 114 for the classification, thereby resulting in a robust and quick detection of the phishing attacks.

Figure 5:
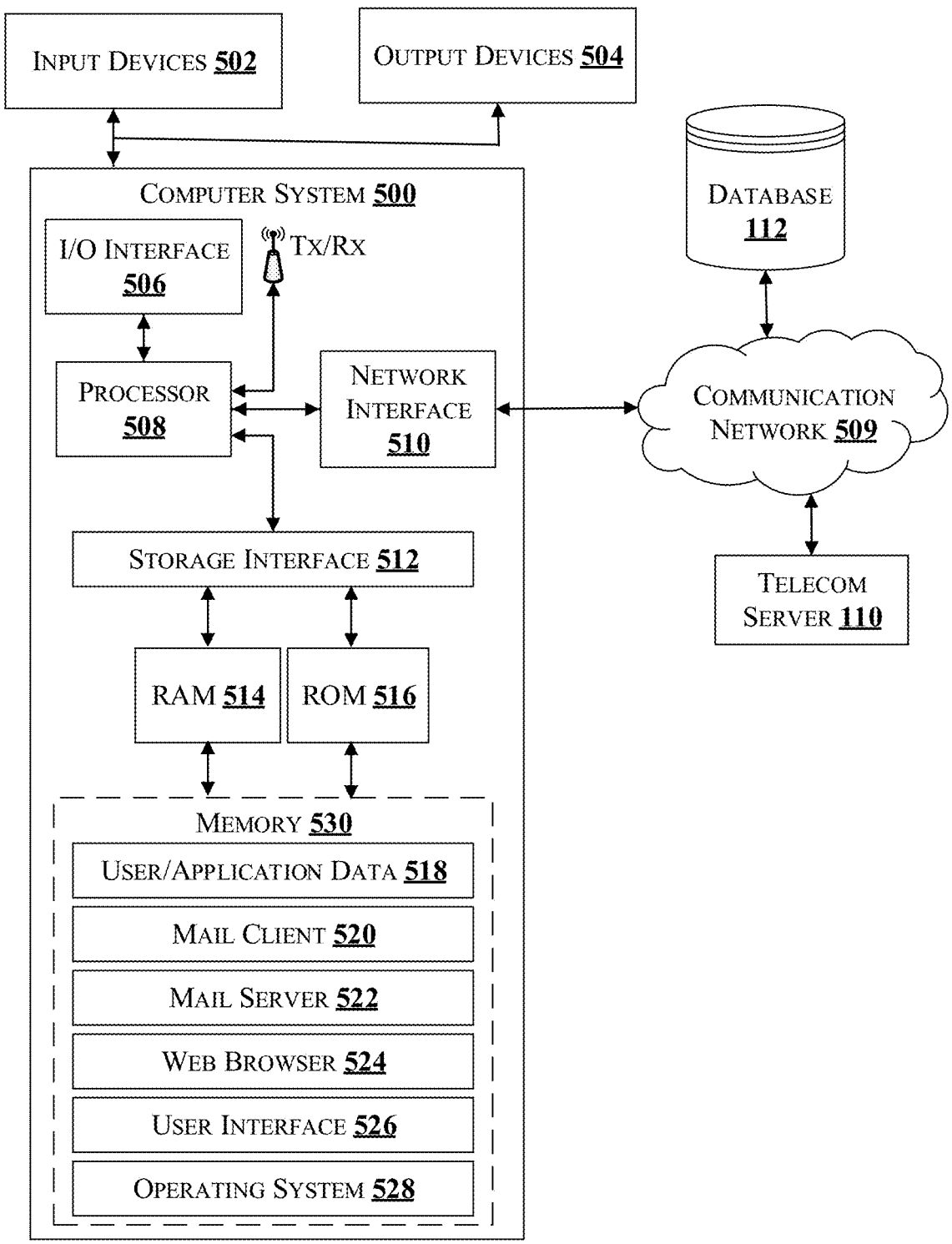
FIG. 5 illustrates an exemplary computer system for implementing embodiments consistent with the present disclosure.

FIG. 5 illustrates a block diagram of an exemplary computer system for implementing embodiments consistent with the present disclosure.

In an embodiment, the computer system 500 may be the UCS 102, used for classifying users for detecting phishing attacks. The computer system 500 may include a central processing unit ('CPU' or 'processor') 508. The processor 508 may comprise at least one data processor for executing program components for executing user or system-generated business processes. The processor 508 may include specialized processing units such as, without limiting to, integrated system (bus) controllers, memory management control units, floating point units, graphics processing units, digital signal processing units, etc.

The processor 508 may be disposed in communication with one or more Input/Output (I/O) devices 502 and 504 via I/O interface 506. The I/O interface 506 may employ communication protocols/methods such as, without limitation, audio, analogue, digital, stereo, IEEE-1694, serial bus, Universal Serial Bus (USB), infrared, PS/2, BNC, coaxial, component, composite, Digital Visual Interface (DVI), High-Definition Multimedia Interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 506, the computer system 500 may communicate with one or more I/O devices 502 and 504. In some implementations, the processor 508 may be disposed in communication with a communication network 509 via a network interface 510. The network interface 510 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 510, the computer system 500 may be connected to the telecom server 110 and the database 112 via the communication network 509.

The communication network 509 can be implemented as one of the several types of networks, such as, without limiting to, intranet or any such wireless network interfaces. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 508 may be disposed in communication with a memory 530 e.g., RAM 514, and ROM 516, etc. as shown in FIG. 5, via a storage interface 512. The storage interface 512 may connect to memory 530 including, without limitation, memory drives, removable disc drives, etc., employing connection protocols such as, without limiting to, Serial Advanced Technology Attachment (SATA), Integrated Drive Electronics (IDE), IEEE-1694, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc. The memory 530 may comprise at least a non-transitory computer readable medium to store program instructions which when executed by the computer system 500 facilitate the computer system 500 to classify a user for detection phishing attacks by performing operations described in various embodiments of the present disclosure.

The memory 530 may store a collection of program or database components, including, without limitation, user/application 518, an operating system 528, a web browser 524, a mail client 520, a mail server 522, a user interface 526, and the like. In some embodiments, computer system 500 may store user/application data 518, such as, without limiting to, the data, variables, records, etc. as described in this invention. Such databases may be implemented as fault-tolerant, relational, scalable, secure databases such as, without limiting to, Oracle or Sybase.

The operating system 528 may facilitate resource management and operation of the computer system 500. Examples of operating systems include, without limitation, Apple Macintosh™ OS X™, UNIX™, Unix-like system distributions (e.g., Berkeley Software Distribution (BSD), FreeBSD™, Net BSD™, Open BSD™, etc.), Linux distributions (e.g., Red Hat™ Ubuntu™ K-Ubuntu™, etc.), International Business Machines (IBM™) OS/2™, Microsoft Windows™ (XP™ Vista/7/8, etc.), Apple iOS™, Google Android™, Blackberry™ Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as, without limiting to, cursors, icons, check boxes, menus, windows, widgets, etc. Graphical User Interfaces (GUIs) may be employed, including, without limitation, Apple™ Macintosh™ operating systems' Aqua™ IBM™ OS/2™, Microsoft™ Windows™ (e.g., Aero, Metro, etc.), Unix X-Windows™, web interface libraries (e.g., ActiveX, Java, JavaScript, AJAX, HTML, Adobe Flash, etc.), or the like.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Referral Numerals:

| Reference Number | Description |
| --- | --- |
| 100 | System Architecture |
| 102 | User Classification System (UCS) |
| 104-1, 104-2, . . . 104-N, 104, 304-1, 304-2, . . . , 304-8, 304 | Users |
| 106-1, 106-2, . . . 106-N, 106 | Usr Device |
| 108 | Cellular Communication Network |
| 110 | Telecom server |
| 112 | Database |
| 114 | User relationship model |
| 202 | Processor |
| 204 | Memory |
| 205 | Data |
| 206 | Modules |
| 208 | Relationship model creation module |
| 210 | Model updation module |
| 212 | User classification module |
| 214 | Other modules |
| 216 | Communication data |
| 218 | Initial reputation scores |
| 220 | Senders |
| 222 | Recipients |

-continued

Referral Numerals:

| Reference Number | Description |
| --- | --- |
| 224 | Updated reputation scores |
| 302-1, 302-2, . . . , 302-8, 302 | Nodes |
| 500 | Computer system |
| 502 | Input devices |
| 504 | Output devices |
| 506 | Input/Output interface of the computer |
| 508 | Processor of the computer system |
| 509 | Communication network |
| 510 | Network interface |
| 512 | Storage interface |
| 514 | RAM |
| 516 | ROM |
| 518 | User/Application data |
| 520 | Mail client |
| 522 | Mail server |
| 524 | Web browser |
| 526 | User interface |

I claim:

1. A method for classifying a user for detecting phishing attacks, the method comprising:
retrieving, by a processor, communication data associated with a plurality of users from a telecom server;
creating a user relationship model, by the processor, in a database, the user relationship model comprising a plurality of nodes representing the plurality of users, wherein each of the plurality of nodes comprising at least the communication data and an initial reputation score; determining, by the processor, one or more senders to the user from the user relationship model;
determining, by the processor, a subset of the one or more senders based on the initial reputation score of each of the one or more senders;
updating, by the processor, the user relationship model at least by updating the initial reputation score of the user based on the communication data of each of the subset of the one or more senders;
classifying, by the processor, the user as one of 'genuine' and 'phishing' based on the updated user relationship model; and
upon classifying the user as 'phishing', dynamically blocking routing of one or more messages received from a Subscriber Identity Module (SIM) associated with the user.

2. The method of claim 1, wherein creating the user relationship model further comprising:
generating the plurality of nodes indicating the plurality of users, wherein each of the plurality of nodes comprising an identifier of a SIM or an Application to Person (A2P) header associated with each of the plurality of users, the communication data and the initial reputation score associated with each of the plurality of users;
determining one or more users sending at least one message to the user as the one or more senders to the user and creating a sender connection between the user and each of the one or more senders; and
determining one or more users receiving at least one message from the user as one or more recipients from the user and creating a recipient connection between the user and each of the one or more recipients.

3. The method of claim 1, wherein the initial reputation score is evaluated based on one or more reputation parameters comprising at least one of a count of messages received by the user, a count of messages transmitted by the user, and a count of messages received from a 'genuine' sender.

4. The method of claim 1, wherein determining the subset of the one or more senders comprising:
   classifying each of the one or more senders as one of a 'genuine' sender and a 'phishing' sender based on the corresponding initial reputation score of the one or more senders; and
   grouping one or more 'genuine' senders as the subset of the one or more senders.

5. The method of claim 1, wherein updating the initial reputation score of the user comprising:
   evaluating a first update factor at least based on the reputation score of each of the subset of the one or more senders, a count of messages received from each of the subset of the one or more senders, a count of messages transmitted by the user and a count of messages received by the user, wherein the first update factor indicating a propagation of reputation from the one or more senders to the user; and
   updating the initial reputation score of the user based on the first update factor.

6. The method of claim 1, wherein updating the user relationship model further comprising updating the initial reputation score of the one or more senders by:
   classifying the user as one of a 'genuine' user or a 'phishing' user based on the initial reputation score;
   generating a second update factor for each of the one or more senders upon classifying the user as the 'phishing' user, wherein the second update factor is generated at least based on the reputation score of the user, a count of messages received by the user from each of the one or more senders, a count of messages transmitted by each of the one or more senders and a count of messages received by each of the one or more senders, wherein the second update factor indicating a propagation of the reputation of the user to the one or more senders; and
   updating the reputation score of each of the one or more senders to an updated sender reputation score, based on the second update factor generated for each of the one or more senders.

7. The method of claim 2, wherein updating the user relationship model further comprising updating an initial reputation score of the one or more recipients by:
   classifying the user as one of a 'genuine' user or a 'phishing' user based on the initial reputation score of the user;
   upon classifying the user as the 'genuine' user, classifying each of the one or more recipients as one of a 'genuine' recipient and a 'phishing' recipient based on the initial reputation scores of the one or more recipients;
   grouping one or more 'genuine' recipients as a subset of recipients;
   generating a third update factor for each of the subset of recipients at least based on the initial reputation score of the subset of recipients, a count of messages received by the subset of recipients from the user, a count of messages transmitted by the subset of recipients and a count of messages received by the subset of recipients; and
   updating the initial reputation score of each of the subset of recipients to an updated recipient reputation score based on the third update factor.

8. The method of claim 1, further comprising:
   classifying each of the plurality of users as one of a 'genuine' user or a 'phishing' user based on the updated user relationship model;
   dynamically blocking routing of one or more messages received from a SIM associated with each of one or more 'phishing' users by:
      generating a blocking notification for blocking the routing, wherein the blocking notification comprising the identifier of the SIM, the one or more messages received from the SIM and the updated reputation score of the 'phishing' user the SIM is associated with; and
      transmitting the blocking notification to the telecom server to block the one or more messages sent from the SIM.

9. The method of claim 1, further comprising:
   retrieving the communication data associated with the plurality of users from the telecom server at predetermined time intervals; and
   generating a first update factor, a second update factor and a third update factor at pre-determined time intervals; and
   updating the initial reputation scores of the plurality of users based on the first update factor, the second update factor and the third update factor thus generated.

10. A system to classify a user for detecting phishing attacks, the system comprising:
   a memory; and
   a processor communicatively coupled with the memory and configured to:
      retrieve communication data associated with a plurality of users from a telecom server;
      create a user relationship model in a database, the user relationship model comprising a plurality of nodes representing the plurality of users, wherein each of the plurality of nodes comprising at least the communication data and an initial reputation score;
      determine one or more senders to the user from the user relationship model;
      determine a subset of the one or more senders based on the initial reputation score of each of the one or more senders;
      update the user relationship model at least by updating the initial reputation score of the user based on the communication data of each of the subset of the one or more senders;
      classify the user as one of 'genuine' and 'phishing' based on the updated user relationship model; and
      upon classifying the user as 'phishing', dynamically block routing of one or more messages received from a Subscriber Identity Module (SIM) associated with the user.

11. The system of claim 10, wherein to create the user relationship model, the processor is configured to:
   generate the plurality of nodes indicating the plurality of users, wherein each of the plurality of nodes comprising an identifier of a SIM or an Application to Person (A2P) header associated with each of the plurality of users, the communication data and the initial reputation score associated with each of the plurality of users;
   determine one or more users sending at least one message to the user as the one or more senders to the user and create a sender connection between the user and each of the one or more senders; and
   determine one or more users receiving at least one message from the user as one or more recipients from the user and creating a recipient connection between the user and each of the one or more recipients.

12. The system of claim 10, wherein the processor is configured to evaluate the initial reputation score based on one or more reputation parameters comprising at least one of a count of messages received by the user, a count of messages transmitted by the user, and a count of messages received from a 'genuine' sender.

13. The system of claim 10, wherein to determine the subset of the one or more senders, the processor is configured to:
classify each of the one or more senders as one of a 'genuine' sender and a 'phishing' sender based on the corresponding initial reputation score of the one or more senders; and
group one or more 'genuine' senders as the subset of the one or more senders.

14. The system of claim 10, wherein to update the initial reputation score of the user, the processor is configured to:
evaluate a first update factor at least based on the reputation score of each of the subset of the one or more senders, a count of messages received from each of the subset of the one or more senders, a count of messages transmitted by the user and a count of messages received by the user, wherein the first update factor indicating a propagation of reputation from the one or more senders to the user; and
update the initial reputation score of the user based on the first update factor.

15. The system of claim 10, wherein to update the user relationship model, the processor is further configured to update the initial reputation score of the one or more senders by:
classifying the user as one of a 'genuine' user or a 'phishing' user based on the initial reputation score of the user;
generating a second update factor for each of the one or more senders upon classifying the user as the 'phishing' user, wherein the second update factor is generated at least based on the reputation score of the user, a count of messages received by the user from each of the one or more senders, a count of messages transmitted by each of the one or more senders and a count of messages received by each of the one or more senders, wherein the second update factor indicating a propagation of the reputation of the user to the one or more senders; and
updating the reputation score of each of the one or more senders to an updated sender reputation score, based on the second update factor generated for each of the one or more senders.

16. The system of claim 11, wherein to update the user relationship model, the processor is further configured to update an initial reputation score of the one or more recipients by:
classifying the user as one of a 'genuine' user or a 'phishing' user based on the initial reputation score of the user;
upon classifying the user as the 'genuine' user, classifying each of the one or more recipients as one of a 'genuine' recipient and a 'phishing' recipient based on the initial reputation scores of the one or more recipients;
grouping one or more 'genuine' recipients as a subset of recipients;
generating a third update factor for each of the subset of recipients at least based on the initial reputation score of the subset of recipients, a count of messages received by the subset of recipients from the user, a count of messages transmitted by the subset of recipients and a count of messages received by the subset of recipients; and
updating the initial reputation score of each of the subset of recipients to an updated recipient reputation score based on the third update factor.

17. The system of claim 10, wherein the processor is further configured to:
classify each of the plurality of users as one of a 'genuine' user or a 'phishing' user based on the updated user relationship model;
dynamically block routing of one or more messages received from a SIM associated with each of one or more 'phishing' users by:
generating a blocking notification for blocking the routing, wherein the blocking notification comprising the identifier of the SIM, the one or more messages received from the SIM and the updated reputation score of the 'phishing' user the SIM is associated with; and
transmitting the blocking notification to the telecom server to block the one or more messages sent from the SIM.

18. The system of claim 10, wherein the processor is further configured to:
retrieve the communication data associated with the plurality of users from the telecom server at predetermined time intervals; and
generate a first update factor, a second update factor and a third update factor at pre-determined time intervals; and
update the initial reputation scores of the plurality of users based on the first update factor, the second update factor and the third update factor thus generated.

19. A non-transitory computer-readable medium, having program instructions stored thereon, when executed by a system, facilitate the system to classify a user for detecting phishing attacks by performing operations comprising:
retrieving communication data associated with a plurality of users from a telecom server;
creating a user relationship model in a database, the user relationship model comprising a plurality of nodes representing the plurality of users, wherein each of the plurality of nodes comprising at least the communication data and an initial reputation score;
determining one or more senders to the user from the user relationship model;
determining a subset of the one or more senders based on the initial reputation score of each of the one or more senders;
updating the user relationship model at least by updating the initial reputation score of the user based on the communication data of each of the subset of the one or more senders;
classifying the user as one of 'genuine' user and 'phishing' based on the updated user relationship model; and
upon classifying the user as 'phishing', dynamically blocking routing of one or more messages received from a Subscriber Identity Module (SIM) associated with the user.

20. The non-transitory computer-readable medium of claim 19, wherein the program instructions configured to create the user relationship model further facilitate:
generating the plurality of nodes indicating the plurality of users, wherein each of the plurality of nodes comprising an identifier of a SIM associated with each of the plurality of users, the communication data and the initial reputation score associated with each of the plurality of users;

determining one or more users sending at least one message to the user as the one or more senders to the user and creating a sender connection between the user and each of the one or more senders; and determining one or more users receiving at least one message from the user as one or more recipients from the user and creating a recipient connection between the user and each of the one or more recipients.

21. The non-transitory computer-readable medium of claim 19, wherein the program instructions further facilitate evaluating the initial reputation score based on one or more reputation parameters comprising at least one of a count of messages received by the user, a count of messages transmitted by the user, and a count of messages received from a 'genuine' sender.

22. The non-transitory computer-readable medium of claim 19, wherein the program instructions configured to determine the subset of the one or more senders facilitate:

classifying each of the one or more senders as one of a 'genuine' sender and a 'phishing' sender based on the corresponding initial reputation score of the one or more senders; and grouping one or more 'genuine' senders as the subset of the one or more senders.

23. The non-transitory computer-readable medium of claim 19, wherein the program instructions configured to update the initial reputation score of the user facilitate:

evaluating a first update factor at least based on the reputation score of each of the subset of the one or more senders, a count of messages received from each of the subset of the one or more senders, a count of messages transmitted by the user and a count of messages received by the user, wherein the first update factor indicating a propagation of reputation from the one or more senders to the user; and updating the initial reputation score of the user based on the first update factor.

24. The non-transitory computer readable medium of claim 19, wherein the program instructions configured to update the user relationship model further facilitate updating the initial reputation score of the one or more senders by:

classifying the user as one of a 'genuine' user or a 'phishing' user based on the initial reputation score;

generating a second update factor for each of the one or more senders upon classifying the user as the 'phishing' user, wherein the second update factor is generated at least based on the reputation score of the user, a count of messages received by the user from each of the one or more senders, a count of messages transmitted by each of the one or more senders and a count of messages received by each of the one or more senders, wherein the second update factor indicating a propagation of the reputation of the user to the one or more senders; and updating the reputation score of each of the one or more senders to an updated sender reputation score, based on the second update factor generated for each of the one or more senders.

25. The non-transitory computer readable medium of claim 20, wherein the program instructions configured to update the user relationship model further facilitate updating an initial reputation score of the one or more recipients by:

classifying the user as one of a 'genuine' user or a 'phishing' user based on the initial reputation score of the user;

upon classifying the user as the 'genuine' user, classifying each of the one or more recipients as one of a 'genuine' recipient and a 'phishing' recipient based on the initial reputation scores of the one or more recipients;

grouping one or more 'genuine' recipients as a subset of recipients;

generating a third update factor for each of the subset of recipients at least based on the initial reputation score of the subset of recipients, a count of messages received by the subset of recipients from the user, a count of messages transmitted by the subset of recipients and a count of messages received by the subset of recipients; and updating the initial reputation score of each of the subset of recipients to an updated recipient reputation score based on the third update factor.

26. The non-transitory computer-readable medium of claim 19, wherein the program instructions further facilitate:

classifying each of the plurality of users as one of a 'genuine' user or a 'phishing' user based on the updated user relationship model;

dynamically blocking routing of one or more messages received from a SIM associated with each of one or more 'phishing' users by:

generating a blocking notification for blocking the routing, wherein the blocking notification comprising the identifier of the SIM, the one or more messages received from the SIM and the updated reputation score of the 'phishing' user the SIM is associated with; and transmitting the blocking notification to the telecom server to block the one or more messages sent from the SIM.

27. The non-transitory computer-readable medium of claim 19, wherein the program instructions further facilitate:

retrieving the communication data associated with the plurality of users from the telecom server at predetermined time intervals; and generating a first update factor, a second update factor and a third update factor at pre-determined time intervals; and updating the initial reputation scores of the plurality of users based on the first update factor, the second update factor and the third update factor thus generated.

* * * * *